(12) United States Patent
Powell et al.

(10) Patent No.: US 10,207,148 B2
(45) Date of Patent: Feb. 19, 2019

(54) SYSTEMS AND METHODS FOR REDUCING RUNAWAY RESISTANCE ON AN EXERCISE DEVICE

(71) Applicant: ICON Health & Fitness, Inc., Logan, UT (US)

(72) Inventors: Wade A. Powell, Logan, UT (US); Dale Alan Buchanan, Nibley, UT (US)

(73) Assignee: ICON Health & Fitness, Inc., Logan, UT (US)

( * ) Notice: Subject to any disclaimer, the term of this patent is extended or adjusted under 35 U.S.C. 154(b) by 0 days.

(21) Appl. No.: 15/730,516

(22) Filed: Oct. 11, 2017

(65) Prior Publication Data

US 2018/0099181 A1    Apr. 12, 2018

Related U.S. Application Data

(60) Provisional application No. 62/407,073, filed on Oct. 12, 2016.

(51) Int. Cl.
*A63B 24/00* (2006.01)
*A63B 22/02* (2006.01)
*H02H 7/08* (2006.01)
*A63B 69/00* (2006.01)
*A63B 22/00* (2006.01)
(Continued)

(52) U.S. Cl.
CPC .......... *A63B 24/00* (2013.01); *A63B 21/0051* (2013.01); *A63B 21/00076* (2013.01); *A63B 21/0084* (2013.01); *A63B 21/0125* (2013.01); *A63B 22/00* (2013.01); *A63B 22/0023* (2013.01); *A63B 22/02* (2013.01); *A63B 22/0235* (2013.01); *A63B 24/0062* (2013.01); *A63B 24/0087* (2013.01); *A63B 69/0028* (2013.01); *A63B 69/0035* (2013.01); *H02H 7/0844* (2013.01); *A63B 22/025* (2015.10); *A63B 22/0242* (2013.01); *A63B 71/0622* (2013.01); *A63B 2071/0081* (2013.01); *A63B 2071/063* (2013.01); *A63B 2220/10* (2013.01); *A63B 2220/18* (2013.01); *A63B 2220/30* (2013.01); *A63B 2220/72* (2013.01); *A63B 2220/833* (2013.01); *A63B 2225/09* (2013.01); *A63B 2225/50* (2013.01)

(58) Field of Classification Search
CPC ...... H02H 7/0844; A63B 22/00; A63B 22/02; A63B 22/0235; A63B 24/00; A63B 69/0028; A63B 69/0035
See application file for complete search history.

(56) References Cited

U.S. PATENT DOCUMENTS

4,749,181 A * 6/1988 Pittaway ................ A63B 22/02
482/54
5,409,435 A 4/1995 Daniels
(Continued)

*Primary Examiner* — Megan Anderson
(74) *Attorney, Agent, or Firm* — Ray Quinney & Nebeker (57) ABSTRACT

A treadmill may include a deck, a first pulley incorporated into the deck, a second pulley incorporated into the deck, a tread belt surrounding the first pulley and the second pulley, a motor in mechanical communication with at least one of the first pulley and the second pulley to move the tread belt in a first direction, and a runaway mitigation mechanism in at least indirect mechanical communication with the motor. The runaway mitigation mechanism at least mitigates a motor runaway condition.

18 Claims, 7 Drawing Sheets

(51) Int. Cl.
*A63B 21/00* (2006.01)
*A63B 21/005* (2006.01)
*A63B 21/008* (2006.01)
*A63B 21/012* (2006.01)
*A63B 71/06* (2006.01)
*A63B 71/00* (2006.01)

(56) References Cited

U.S. PATENT DOCUMENTS

| | | |
|---|---|---|
| 5,476,430 A | 12/1995 | Lee et al. |
| 6,042,513 A * | 3/2000 | Koteles .......... A63B 24/00 318/1 |
| 6,676,569 B1 * | 1/2004 | Radow .......... A63B 22/0235 482/4 |
| 8,395,366 B2 | 3/2013 | Uno |
| 8,480,541 B1 | 7/2013 | Brunts |
| 8,506,370 B2 | 8/2013 | Homsi |
| 8,550,962 B2 | 10/2013 | Piaget et al. |
| 8,602,951 B2 | 12/2013 | Morris |
| 2006/0276306 A1 | 12/2006 | Pan et al. |
| 2007/0010383 A1 | 1/2007 | Pertegaz-Esteban |
| 2007/0015636 A1 | 1/2007 | Molter |
| 2007/0037667 A1 | 2/2007 | Gordon |
| 2008/0001772 A1 | 1/2008 | Saito |
| 2008/0020898 A1 | 1/2008 | Pyles et al. |
| 2008/0020907 A1 * | 1/2008 | Lin .......... A61H 1/005 482/54 |
| 2008/0032871 A1 | 2/2008 | Yeh |
| 2008/0096745 A1 | 4/2008 | Perry |
| 2008/0190745 A1 | 8/2008 | Taniguchi et al. |
| 2008/0214358 A1 | 9/2008 | Ogg et al. |
| 2008/0242511 A1 | 10/2008 | Munoz et al. |
| 2008/0312048 A1 * | 12/2008 | Cassano .......... A63B 22/0235 482/54 |
| 2009/0111665 A1 | 4/2009 | Wang |
| 2009/0118098 A1 | 5/2009 | Yeh |
| 2009/0124464 A1 | 5/2009 | Kastelic |
| 2009/0137367 A1 * | 5/2009 | Hendrickson ...... A63B 21/0051 482/54 |
| 2009/0156363 A1 | 6/2009 | Guidi et al. |
| 2009/0163327 A1 | 6/2009 | Huang et al. |
| 2009/0227424 A1 | 9/2009 | Hirata et al. |
| 2009/0227432 A1 | 9/2009 | Pacheco |
| 2009/0232420 A1 | 9/2009 | Eisenberg et al. |
| 2009/0240858 A1 | 9/2009 | Takebayashi |
| 2009/0246746 A1 | 10/2009 | Roerdink et al. |
| 2009/0253554 A1 | 10/2009 | Mcintosh |
| 2009/0258710 A1 | 10/2009 | Quatrochi et al. |
| 2009/0258763 A1 | 10/2009 | Richter |
| 2009/0269728 A1 | 10/2009 | Verstegen et al. |
| 2009/0286653 A1 | 11/2009 | Wiber |
| 2009/0293319 A1 | 12/2009 | Avni |
| 2009/0312158 A1 | 12/2009 | Trevino et al. |
| 2010/0015585 A1 | 1/2010 | Baker |
| 2010/0016127 A1 | 1/2010 | Farnsworth et al. |
| 2010/0022354 A1 | 1/2010 | Fisher |
| 2010/0024590 A1 | 2/2010 | O'neill |
| 2010/0032533 A1 | 2/2010 | Chen et al. |
| 2010/0035726 A1 | 2/2010 | Fisher et al. |
| 2010/0041516 A1 | 2/2010 | Kodama |
| 2010/0048358 A1 | 2/2010 | Tchao et al. |
| 2010/0062904 A1 | 3/2010 | Crawford et al. |
| 2010/0062914 A1 | 3/2010 | Splane |
| 2010/0063426 A1 | 3/2010 | Planke |
| 2010/0064255 A1 | 3/2010 | Rottler et al. |
| 2010/0079291 A1 | 4/2010 | Kroll et al. |
| 2010/0081548 A1 | 4/2010 | Labedz |
| 2010/0087298 A1 | 4/2010 | Zaccherini |
| 2010/0099541 A1 | 4/2010 | Patel |
| 2010/0105527 A1 | 4/2010 | Johnson |
| 2010/0113223 A1 | 5/2010 | Chiles et al. |
| 2010/0125026 A1 | 5/2010 | Zavadsky et al. |
| 2010/0130337 A1 | 5/2010 | Stewart |
| 2010/0137105 A1 | 6/2010 | McLaughlin |
| 2010/0144501 A1 | 6/2010 | Berhanu |
| 2010/0156625 A1 | 6/2010 | Ruha |
| 2010/0167883 A1 | 7/2010 | Grind |
| 2010/0173276 A1 | 7/2010 | Vasin |
| 2010/0173755 A1 | 7/2010 | P Erez De Lazarraga |
| 2010/0175634 A1 | 7/2010 | Chang et al. |
| 2010/0184568 A1 | 7/2010 | Schippers |
| 2010/0190615 A1 | 7/2010 | Baker et al. |
| 2010/0192715 A1 | 8/2010 | Vauchel et al. |
| 2010/0197462 A1 | 8/2010 | Piane, Jr. |
| 2010/0197465 A1 | 8/2010 | Stevenson |
| 2010/0210418 A1 | 8/2010 | Park |
| 2010/0216599 A1 | 8/2010 | Watterson |
| 2010/0216600 A1 | 8/2010 | Noffsinger |
| 2010/0216607 A1 | 8/2010 | Mueller |
| 2010/0222179 A1 | 9/2010 | Temple et al. |
| 2010/0222182 A1 | 9/2010 | Park |
| 2010/0227740 A1 | 9/2010 | Liu |
| 2010/0235667 A1 | 9/2010 | Mucignat et al. |
| 2010/0240458 A1 | 9/2010 | Gaiba et al. |
| 2010/0248899 A1 | 9/2010 | Bedell et al. |
| 2010/0255959 A1 | 10/2010 | Dalebout et al. |
| 2010/0267524 A1 | 10/2010 | Stewart et al. |
| 2010/0279822 A1 | 11/2010 | Ford |
| 2010/0285933 A1 | 11/2010 | Nalley |
| 2010/0289466 A1 | 11/2010 | Telefus |
| 2010/0289772 A1 | 11/2010 | Miller |
| 2010/0292050 A1 | 11/2010 | DiBenedetto et al. |
| 2010/0304931 A1 | 12/2010 | Stumpf |
| 2010/0304932 A1 | 12/2010 | Kolman et al. |
| 2010/0311552 A1 | 12/2010 | Sumners |
| 2011/0003664 A1 | 1/2011 | Richard |
| 2011/0021319 A1 | 1/2011 | Nissila et al. |
| 2011/0028282 A1 | 2/2011 | Sbragia |
| 2011/0034300 A1 | 2/2011 | Hall |
| 2011/0054359 A1 | 3/2011 | Sazonov et al. |
| 2011/0056328 A1 | 3/2011 | Ko |
| 2011/0061840 A1 | 3/2011 | Goldmann |
| 2011/0065371 A1 | 3/2011 | Leff |
| 2011/0065373 A1 | 3/2011 | Goldmann |
| 2011/0067361 A1 | 3/2011 | Sloan |
| 2011/0073743 A1 | 3/2011 | Shamie |
| 2011/0077055 A1 | 3/2011 | Pakula et al. |
| 2011/0082013 A1 | 4/2011 | Bastian |
| 2011/0086707 A1 | 4/2011 | Loveland |
| 2011/0087137 A1 | 4/2011 | Hanoun |
| 2011/0087445 A1 | 4/2011 | Sobolewski |
| 2011/0087446 A1 | 4/2011 | Redmond |
| 2011/0093100 A1 | 4/2011 | Ramsay |
| 2011/0098157 A1 | 4/2011 | Whalen et al. |
| 2011/0098615 A1 | 4/2011 | Whalen et al. |
| 2011/0109283 A1 | 5/2011 | Kapels et al. |
| 2011/0112771 A1 | 5/2011 | French |
| 2011/0118089 A1 | 5/2011 | Ellis |
| 2011/0124466 A1 | 5/2011 | Nishimura |
| 2011/0124476 A1 | 5/2011 | Holley |
| 2011/0131005 A1 | 6/2011 | Ueshima et al. |
| 2011/0136627 A1 | 6/2011 | Williams |
| 2011/0143769 A1 | 6/2011 | Jones et al. |
| 2011/0143898 A1 | 6/2011 | Trees |
| 2011/0152037 A1 | 6/2011 | Tsou |
| 2011/0152038 A1 | 6/2011 | Freitag |
| 2011/0152039 A1 | 6/2011 | Hendrickson et al. |
| 2011/0152635 A1 | 6/2011 | Morris et al. |
| 2011/0172060 A1 | 7/2011 | Morales et al. |
| 2011/0175744 A1 | 7/2011 | Englert et al. |
| 2011/0181420 A1 | 7/2011 | Mack et al. |
| 2011/0188269 A1 | 8/2011 | Hosotani |
| 2011/0197157 A1 | 8/2011 | Hoffman et al. |
| 2011/0199799 A1 | 8/2011 | Hui et al. |
| 2011/0201481 A1 | 8/2011 | Lo |
| 2011/0202236 A1 | 8/2011 | Galasso et al. |
| 2011/0205164 A1 | 8/2011 | Hansen et al. |
| 2011/0221672 A1 | 9/2011 | Osterhout et al. |
| 2011/0247530 A1 | 10/2011 | Coffman |
| 2011/0252597 A1 | 10/2011 | Burris et al. |
| 2011/0257797 A1 | 10/2011 | Burris et al. |
| 2011/0269517 A1 | 11/2011 | Englert et al. |
| 2011/0269604 A1 | 11/2011 | Tseng |

(56) References Cited

U.S. PATENT DOCUMENTS

| | | |
|---|---|---|
| 2011/0275482 A1 | 11/2011 | Brodess et al. |
| 2011/0275489 A1 | 11/2011 | Apau |
| 2011/0275499 A1 | 11/2011 | Eschenbach |
| 2011/0281691 A1 | 11/2011 | Ellis |
| 2011/0283188 A1 | 11/2011 | Farrenkopf et al. |
| 2011/0283231 A1 | 11/2011 | Richstein et al. |
| 2011/0308919 A1 | 12/2011 | Hahn |
| 2011/0312473 A1 | 12/2011 | Chu et al. |
| 2011/0319229 A1 | 12/2011 | Corbalis et al. |
| 2012/0004075 A1 | 1/2012 | Kissel et al. |
| 2012/0004080 A1 | 1/2012 | Webb |
| 2012/0010053 A1 | 1/2012 | Bayerlein et al. |
| 2012/0015778 A1 | 1/2012 | Lee et al. |
| 2012/0015779 A1 | 1/2012 | Powch et al. |
| 2012/0015784 A1 | 1/2012 | Reed |
| 2012/0020135 A1 | 1/2012 | McCune |
| 2012/0021873 A1 | 1/2012 | Brunner |
| 2012/0021875 A1 | 1/2012 | Karl |
| 2012/0032896 A1 | 2/2012 | Vesely |
| 2012/0071301 A1 | 3/2012 | Kaylor et al. |
| 2012/0088633 A1 | 4/2012 | Crafton |
| 2012/0088634 A1 | 4/2012 | Heidecke |
| 2012/0088640 A1 | 4/2012 | Wissink |
| 2012/0116684 A1 | 5/2012 | Ingrassia et al. |
| 2012/0132877 A1 | 5/2012 | Wang |
| 2012/0133192 A1 | 5/2012 | Simpson |
| 2012/0165162 A1 | 6/2012 | Lu |
| 2012/0169603 A1 | 7/2012 | Peterson et al. |
| 2012/0174833 A1 | 7/2012 | Early |
| 2012/0178590 A1 | 7/2012 | Lu |
| 2012/0187012 A1 | 7/2012 | TeVault et al. |
| 2012/0212505 A1 | 8/2012 | Burroughs et al. |
| 2012/0218184 A1 | 8/2012 | Wissmar |
| 2012/0230504 A1 | 9/2012 | Kuroda |
| 2012/0242774 A1 | 9/2012 | Numano et al. |
| 2012/0248263 A1 | 10/2012 | Grotenhuis |
| 2012/0252580 A1 | 10/2012 | Dugan |
| 2012/0253234 A1 | 10/2012 | Yang et al. |
| 2012/0253489 A1 | 10/2012 | Dugan |
| 2012/0258433 A1 | 10/2012 | Hope et al. |
| 2012/0263892 A1 | 10/2012 | Rodgers |
| 2012/0270705 A1 | 10/2012 | Lo |
| 2012/0271143 A1 | 10/2012 | Aragones et al. |
| 2012/0277040 A1 | 11/2012 | Vincent et al. |
| 2012/0277891 A1 | 11/2012 | Aragones et al. |
| 2012/0293141 A1 | 11/2012 | Zhang et al. |
| 2012/0296455 A1 | 11/2012 | Ohnemus et al. |
| 2012/0298017 A1 | 11/2012 | Chen |
| 2012/0300515 A1 | 11/2012 | Carletti et al. |
| 2012/0319604 A1 | 12/2012 | Walters |
| 2012/0326873 A1 | 12/2012 | Utter, II |
| 2013/0002533 A1 | 1/2013 | Burroughs et al. |
| 2013/0004010 A1 | 1/2013 | Royer |
| 2013/0009993 A1 | 1/2013 | Horseman |
| 2013/0018494 A1 | 1/2013 | Amini |
| 2013/0034671 A1 | 2/2013 | George |
| 2013/0035612 A1 | 2/2013 | Mason et al. |
| 2013/0040783 A1 | 2/2013 | Duda et al. |
| 2013/0041590 A1 | 2/2013 | Burich et al. |
| 2013/0041617 A1 | 2/2013 | Pease et al. |
| 2013/0044521 A1 | 2/2013 | Zhao et al. |
| 2013/0050973 A1 | 2/2013 | Rohrbach |
| 2013/0053222 A1 | 2/2013 | Lo |
| 2013/0053990 A1 | 2/2013 | Ackland |
| 2013/0092647 A1 | 4/2013 | Chen |
| 2013/0095959 A1 | 4/2013 | Marty |
| 2013/0095978 A1 | 4/2013 | Sauter |
| 2013/0130868 A1 | 5/2013 | Hou |
| 2013/0130869 A1 | 5/2013 | Hou |
| 2013/0139736 A1 | 6/2013 | Flaherty |
| 2013/0141235 A1 | 6/2013 | Utter, II |
| 2013/0147411 A1 | 6/2013 | Pang et al. |
| 2013/0150214 A1 | 6/2013 | Wu |
| 2013/0154441 A1 | 6/2013 | Redmond |
| 2013/0165297 A1 | 6/2013 | Daly |
| 2013/0172152 A1 | 7/2013 | Watterson |
| 2013/0182781 A1 | 7/2013 | Matsutani |
| 2013/0185003 A1 | 7/2013 | Carbeck et al. |
| 2013/0190136 A1 | 7/2013 | Watterson |
| 2013/0190657 A1 | 7/2013 | Flaction et al. |
| 2013/0196821 A1 | 8/2013 | Watterson et al. |
| 2013/0196826 A1 | 8/2013 | Colledge |
| 2013/0196827 A1 | 8/2013 | Chang |
| 2013/0211858 A1 | 8/2013 | Ohnemus et al. |
| 2013/0228063 A1 | 9/2013 | Turner |
| 2013/0228422 A1 | 9/2013 | Mathieu |
| 2013/0231219 A1 | 9/2013 | Huang |
| 2013/0237383 A1 | 9/2013 | Chen |
| 2013/0245966 A1 | 9/2013 | Burroughs et al. |
| 2013/0263418 A1 | 10/2013 | Johnson, Jr. |
| 2013/0267386 A1 | 10/2013 | Her |
| 2013/0274040 A1 | 10/2013 | Coza et al. |
| 2013/0274069 A1 | 10/2013 | Watterson et al. |
| 2013/0274071 A1 | 10/2013 | Wang |
| 2013/0280682 A1 | 10/2013 | Levine et al. |
| 2013/0324368 A1 | 12/2013 | Aragones et al. |
| 2013/0325394 A1 | 12/2013 | Yuen et al. |
| 2013/0338802 A1 | 12/2013 | Winsper et al. |
| 2013/0346043 A1 | 12/2013 | Mewes et al. |
| 2014/0011645 A1 | 1/2014 | Johnson et al. |
| 2014/0026788 A1 | 1/2014 | Kallio, III et al. |
| 2014/0031703 A1 | 1/2014 | Rayner et al. |
| 2014/0039840 A1 | 2/2014 | Yuen et al. |
| 2014/0052280 A1 | 2/2014 | Yuen et al. |
| 2014/0056461 A1 | 2/2014 | Afshar |
| 2014/0073488 A1 | 3/2014 | Wu |
| 2014/0080678 A1 | 3/2014 | Wu |
| 2014/0085077 A1 | 3/2014 | Luna et al. |
| 2014/0100464 A1 | 4/2014 | Kaleal et al. |
| 2014/0102340 A1 | 4/2014 | Kooistra |
| 2014/0121066 A1 | 5/2014 | Huang et al. |
| 2014/0139450 A1 | 5/2014 | Levesque et al. |
| 2014/0156228 A1 | 6/2014 | Molettiere et al. |
| 2014/0187383 A1 | 7/2014 | Martin |
| 2014/0195103 A1 | 7/2014 | Nassef |
| 2014/0221160 A1 | 8/2014 | Hardy et al. |
| 2014/0222173 A1 | 8/2014 | Giedwoyn et al. |
| 2014/0265690 A1 | 9/2014 | Henderson |
| 2014/0270375 A1 | 9/2014 | Canavan et al. |
| 2014/0274564 A1 | 9/2014 | Greenbaum |
| 2014/0274579 A1 | 9/2014 | Olson |
| 2014/0360413 A1 | 12/2014 | Schenk |
| 2015/0001048 A1 | 1/2015 | Koppes et al. |
| 2015/0003621 A1 | 1/2015 | Trammell |
| 2015/0004579 A1 | 1/2015 | Shelton |
| 2015/0016623 A1 | 1/2015 | Trammell |
| 2015/0044648 A1 | 2/2015 | White et al. |
| 2015/0048807 A1 | 2/2015 | Fan et al. |
| 2015/0065273 A1 | 3/2015 | Lake |
| 2015/0065301 A1 | 3/2015 | Oteman |
| 2015/0105220 A1 | 4/2015 | Hong |
| 2015/0192929 A1 | 7/2015 | Rihn et al. |
| 2015/0199494 A1 | 7/2015 | Koduri et al. |
| 2015/0201722 A1 | 7/2015 | Brouard |
| 2015/0202487 A1 | 7/2015 | Wu |
| 2015/0209610 A1 | 7/2015 | Dalebout et al. |
| 2015/0209617 A1 | 7/2015 | Hsiao |
| 2015/0246751 A1 | 9/2015 | Spivack et al. |
| 2015/0250304 A1 | 9/2015 | Dalebout |
| 2015/0251047 A1 | 9/2015 | Jussi Maanitty |
| 2015/0251048 A1 | 9/2015 | Dalebout |
| 2015/0251055 A1 | 9/2015 | Ashby |
| 2015/0253210 A1 | 9/2015 | Ashby et al. |
| 2015/0265903 A1 | 9/2015 | Kolen et al. |
| 2015/0295397 A1 | 10/2015 | Lin et al. |
| 2015/0314184 A1 | 11/2015 | Moya Saez |
| 2015/0346994 A1 | 12/2015 | Chanyontpatanakul |
| 2015/0352396 A1 | 12/2015 | Dalebout |
| 2015/0352401 A1 | 12/2015 | Johnson |
| 2015/0352402 A1 | 12/2015 | Arnold et al. |
| 2015/0367158 A1 | 12/2015 | Pretz et al. |
| 2015/0367176 A1 | 12/2015 | Bejestan et al. |
| 2016/0008650 A1 | 1/2016 | Jue et al. |
| 2016/0016035 A1 | 1/2016 | Hao |

(56) References Cited

U.S. PATENT DOCUMENTS

| | | |
|---|---|---|
| 2016/0027325 A1 | 1/2016 | Malhotra |
| 2016/0038785 A1 | 2/2016 | Netter |
| 2016/0047446 A1 | 2/2016 | Hung |
| 2016/0066818 A1 | 3/2016 | Cowley et al. |
| 2016/0096064 A1 | 4/2016 | Gatti |
| 2016/0121161 A1 | 5/2016 | Mountain |
| 2016/0193518 A1 | 7/2016 | Baxter |
| 2016/0211841 A1 | 7/2016 | Harrison |
| 2016/0219968 A1 | 8/2016 | Martin |
| 2016/0263426 A1 | 9/2016 | Mueller et al. |
| 2016/0303421 A1 | 10/2016 | Tyger et al. |
| 2016/0317861 A1 | 11/2016 | Dalebout |
| 2016/0367851 A1 | 12/2016 | Astilean et al. |
| 2017/0056726 A1 | 3/2017 | Dalebout et al. |
| 2017/0068782 A1 | 3/2017 | Pillai et al. |
| 2017/0113093 A1 | 4/2017 | Bellavista et al. |
| 2017/0120102 A1 | 5/2017 | Chen |
| 2017/0128784 A1 | 5/2017 | Molins et al. |
| 2017/0136280 A1 | 5/2017 | Lee |
| 2017/0136288 A1 | 5/2017 | Huang |
| 2017/0136289 A1 | 5/2017 | Frank |
| 2017/0136291 A1 | 5/2017 | Huang |
| 2017/0136339 A1 | 5/2017 | Habiche |
| 2017/0165523 A1 | 6/2017 | Chou |
| 2017/0189745 A1 | 7/2017 | Hamilton et al. |
| 2017/0216660 A1 | 8/2017 | Lernihan |
| 2017/0266483 A1 | 9/2017 | Dalebout et al. |
| 2017/0266532 A1 | 9/2017 | Watterson |
| 2017/0266533 A1 | 9/2017 | Dalebout |
| 2017/0266534 A1 | 9/2017 | Watterson |
| 2017/0266535 A1 | 9/2017 | Watterson |
| 2017/0274242 A1 | 9/2017 | Corbalis |
| 2017/0326411 A1 | 11/2017 | Watterson |
| 2017/0340917 A1 | 11/2017 | Chang |
| 2017/0368442 A1 | 12/2017 | Baudhuin |
| 2018/0001135 A1 | 1/2018 | Powell |
| 2018/0036585 A1 | 2/2018 | Powell |
| 2018/0056111 A1 | 3/2018 | Chiang et al. |
| 2018/0092603 A1 | 4/2018 | Duan et al. |
| 2018/0099179 A1 | 4/2018 | Chatterton et al. |
| 2018/0099180 A1 | 4/2018 | Wilkinson |
| 2018/0099181 A1 | 4/2018 | Powell et al. |
| 2018/0104533 A1 | 4/2018 | Powell et al. |
| 2018/0111018 A1 | 4/2018 | Lee |
| 2018/0117385 A1 | 5/2018 | Watterson et al. |
| 2018/0117388 A1 | 5/2018 | Porter |
| 2018/0117419 A1 | 5/2018 | Jackson |
| 2018/0147440 A1 | 5/2018 | Lin |
| 2018/0154208 A1 | 6/2018 | Powell et al. |

\* cited by examiner

SYSTEMS AND METHODS FOR REDUCING RUNAWAY RESISTANCE ON AN EXERCISE DEVICE

RELATED APPLICATIONS

This application claims priority to U.S. Patent Application Ser. No. 62/407,073 titled "Systems and Methods for Reducing Runaway Resistance on an Exercise Device" and filed on 12 Oct. 2016, which application is herein incorporated by reference for all that it discloses.

BACKGROUND

Aerobic exercise is a popular form of exercise that improves one's cardiovascular health by reducing blood pressure and providing other benefits to the human body. Aerobic exercise generally involves low intensity physical exertion over a long duration of time. Typically, the human body can adequately supply enough oxygen to meet the body's demands at the intensity levels involved with aerobic exercise. Popular forms of aerobic exercise include running, jogging, swimming, and cycling, among others activities. In contrast, anaerobic exercise typically involves high intensity exercises over a short duration of time. Popular forms of anaerobic exercise include strength training and short distance running.

Many choose to perform aerobic exercises indoors, such as in a gym or their home. Often, a user will use an aerobic exercise machine to have an aerobic workout indoors. One type of aerobic exercise machine is a treadmill, which is a machine that has a running deck attached to a support frame. The running deck can support the weight of a person using the machine. The running deck incorporates a conveyor belt that is driven by a motor. A user can run or walk in place on the conveyor belt by running or walking at the conveyor belt's speed. The speed and other operations of the treadmill are generally controlled through a control module that is also attached to the support frame and within a convenient reach of the user. The control module can include a display, buttons for increasing or decreasing a speed of the conveyor belt, controls for adjusting a tilt angle of the running deck, or other controls. Other popular exercise machines that allow a user to perform aerobic exercises indoors include elliptical trainers, rowing machines, stepper machines, and stationary bikes, to name a few.

One type of treadmill is disclosed in U.S. Pat. No. 6,042,513 issued to John Koteles, et al. In this reference, a runaway protection mechanism is provided. In use, the electric motor is connected to an electric power source, such as an alternating-current wall outlet. The runaway protection mechanism includes a disconnect mechanism for disconnecting the motor from the electric power source and thereby de-energizing the motor. The runaway protection mechanism further includes a safety mechanism for comparing the actual motor speed with a desired motor speed and activating the disconnect mechanism when the actual speed exceeds the desired speed by a predetermined amount.

SUMMARY

In one embodiment, a treadmill includes a deck, a first pulley incorporated into the deck, a second pulley incorporated into the deck, a tread belt surrounding the first pulley and the second pulley, a motor in mechanical communication with at least one of the first pulley and the second pulley to move the tread belt in a first direction, and a runaway mitigation mechanism in at least indirect mechanical communication with the motor. The runaway mitigation mechanism at least mitigates a motor runaway condition.

The motor runaway condition may be induced when a user moves the tread belt with a force that is greater than that outputted with the motor.

The user may move the tread belt at the force that is greater than that which is outputted with the motor when the incline angle of the deck exceeds a threshold angle.

The runaway mitigation mechanism may include a container of fluid and the motor includes a drive shaft. When the container tilts with the deck at the threshold angle, the fluid may contact the drive shaft, and when the drive shaft is rotating and in contact with the fluid, the fluid may increase a resistance to the rotation of the drive shaft.

The drive shaft may include at least one vane.

The drive shaft may be fully immersed in the fluid when the deck is oriented at a 12 degree incline or greater.

The drive shaft may be partially immersed in the fluid with the deck is oriented at a 9 to 12 degree incline.

The fluid may be an oil based fluid.

The runaway mitigation mechanism may increase a resistance to the operation of the motor when the deck is oriented at the threshold angle that induces the motor runaway condition.

The threshold angle may be over 9 degrees.

The threshold angle may be over 11 degrees.

The runaway mitigation mechanism may include a brake pad.

The runaway mitigation mechanism may include a magnetic mechanism.

In one embodiment, a treadmill may include a deck, a first pulley incorporated into the deck, a second pulley incorporated into the deck, a tread belt surrounding the first pulley and the second pulley, a motor in mechanical communication with at least one of the first pulley and the second pulley, an incline mechanism in mechanical communication with the deck to adjust an incline angle of the deck, and a runaway mitigation mechanism is in communication with the motor. The runaway mitigation mechanism may at least mitigate a motor runaway condition is induced by the incline angle of the deck, and the runaway mitigation mechanism may include a container of fluid. The motor may include a drive shaft. The container may tilt at the incline angle that induces the motor runaway condition so that the fluid contacts the drive shaft. When the drive shaft is rotating and in contact with the fluid, the fluid increases a resistance to the rotation of the drives shaft.

The drive shaft may include at least one vane.

The drive shaft may be fully immersed in the fluid when the deck is oriented at a 12 degree incline.

The motor runaway condition may be induced when a user moves the tread belt with a force that is greater than that outputted with the motor.

The fluid may be an oil based fluid.

The incline angle that may induce the motor runaway condition is over 11 degrees.

In one embodiment, a treadmill may include a deck, a first pulley incorporated into the deck, a second pulley incorporated into the deck, a tread belt surrounding the first pulley and the second pulley, a motor in mechanical communication with at least one of the first pulley and the second pulley, an incline mechanism in mechanical communication with the deck to adjust an incline angle of the deck, and a runaway mitigation mechanism is in communication with the motor. The runaway mitigation mechanism mitigates a motor runaway condition where the motor runaway condition is induced by the incline angle of the deck and the runaway mitigation mechanism includes a container of an oil based fluid. The motor includes a drive shaft, and the drive shaft includes at least one vane. The container tilts at the incline angle that induces the motor runaway condition so that the fluid contacts the drive shaft, and when the drive shaft is rotating and in contact with the fluid, the fluid increases a resistance to the rotation of the drive shaft. The drive shaft is fully immersed in the fluid when the deck is oriented at a 12 degree incline.

DETAILED DESCRIPTION

For purposes of this disclosure, the term "aligned" means parallel, substantially parallel, or forming an angle of less than 35.0 degrees. For purposes of this disclosure, the term "transverse" means perpendicular, substantially perpendicular, or forming an angle between 55.0 and 125.0 degrees. Also, for purposes of this disclosure, the term "length" means the longest dimension of an object. Also, for purposes of this disclosure, the term "width" means the dimension of an object from side to side. Often, the width of an object is transverse the object's length. For the purposes of this disclosure, an "output speed" generally refers to a speed of the motor's drive shaft that correlates to the amount of electricity supplied to the motor. Such an output speed may be affected, but not controlled, by the mechanical load on the motor because the amount of electricity supplied to the motor may vary, depending on the motor's mechanical load. Additionally, for the purposes of this disclosure, the term "runaway" generally refers to instances where the drive shaft operates at an actual speed that is inconsistent with the motor's output speed. Examples of runaway include where the drive shaft is turned in reverse, the drive shaft rotates at a speed faster than the output speed, other conditions, or combinations thereof. Further, for the purposes of this disclosure, the term "runaway mitigation" may generally refer to at least bringing the output speed and the actual speed of the drive shaft into closer alignment. In some cases, a runaway mitigation mechanism increases a mechanical load on the motor.

Figure 1:
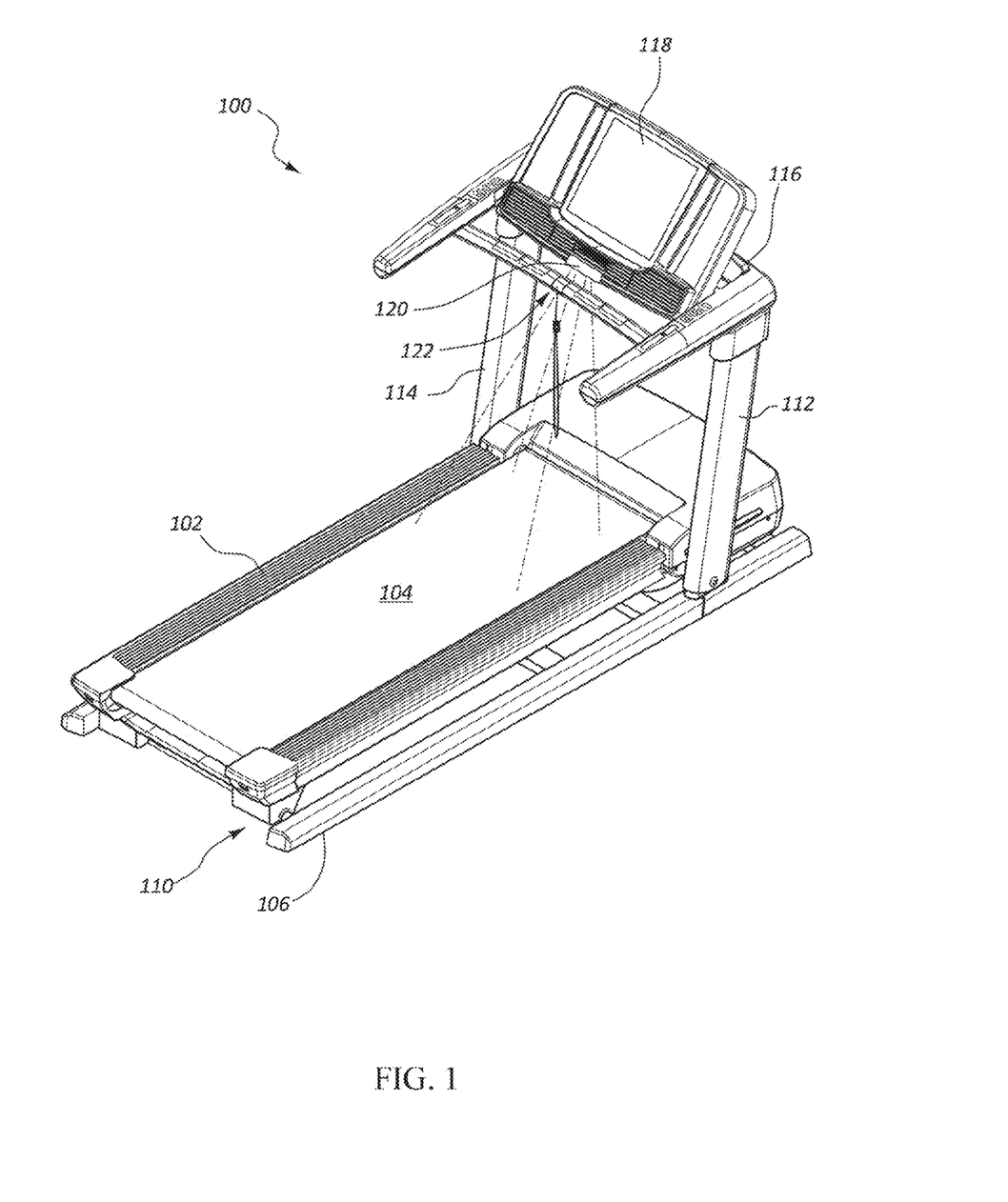
FIG. 1 depicts an example of a treadmill in accordance with aspects of the present disclosure.

FIG. 1 depicts an example of a treadmill 100 having a deck 102 with a first pulley disposed in a front portion of the deck 102 and a second pulley incorporated into a rear portion of the deck 102. A tread belt 104 surrounds the first pulley and the second pulley. A motor is in mechanical communication with either the first pulley or the second pulley. A motor (not shown) drives the tread belt 104. With the deck 102 oriented in a substantially horizontal position, a user's body weight pushes the underside of the tread belt 104 into the deck's upper surface, which generates an amount of friction between the belt and the deck, which friction increases the load on the motor. Additionally, the tread belt also carries the portion of the user's weight along the length of the deck as the motor operates, which also increases the load on the motor.

The rear portion of the deck 102 is attached to a base member 106 of the treadmill's frame. A pivot connection 110 between the rear portion of the deck 102 and the base member 106 allows the front portion of the deck 102 to incline upwards or decline downwards. When the deck 102 inclines or declines, the base member 106 remains stationary.

A first side post 112 is attached to a first side of the base member 106, and a second side post 114 is attached to a second side of the base member 106. In the example depicted in FIG. 1, the first side post 112 and the second side post 114 also remain stationary as the deck 102 inclines and/or declines. The first side post 112 and the second side post 114 collectively support a console 116. The console 116 includes a display 118 and an input mechanism 120 for controlling the deck's incline angle. Additionally, an emergency stop feature 122 may be included on the console.

Figure 2:
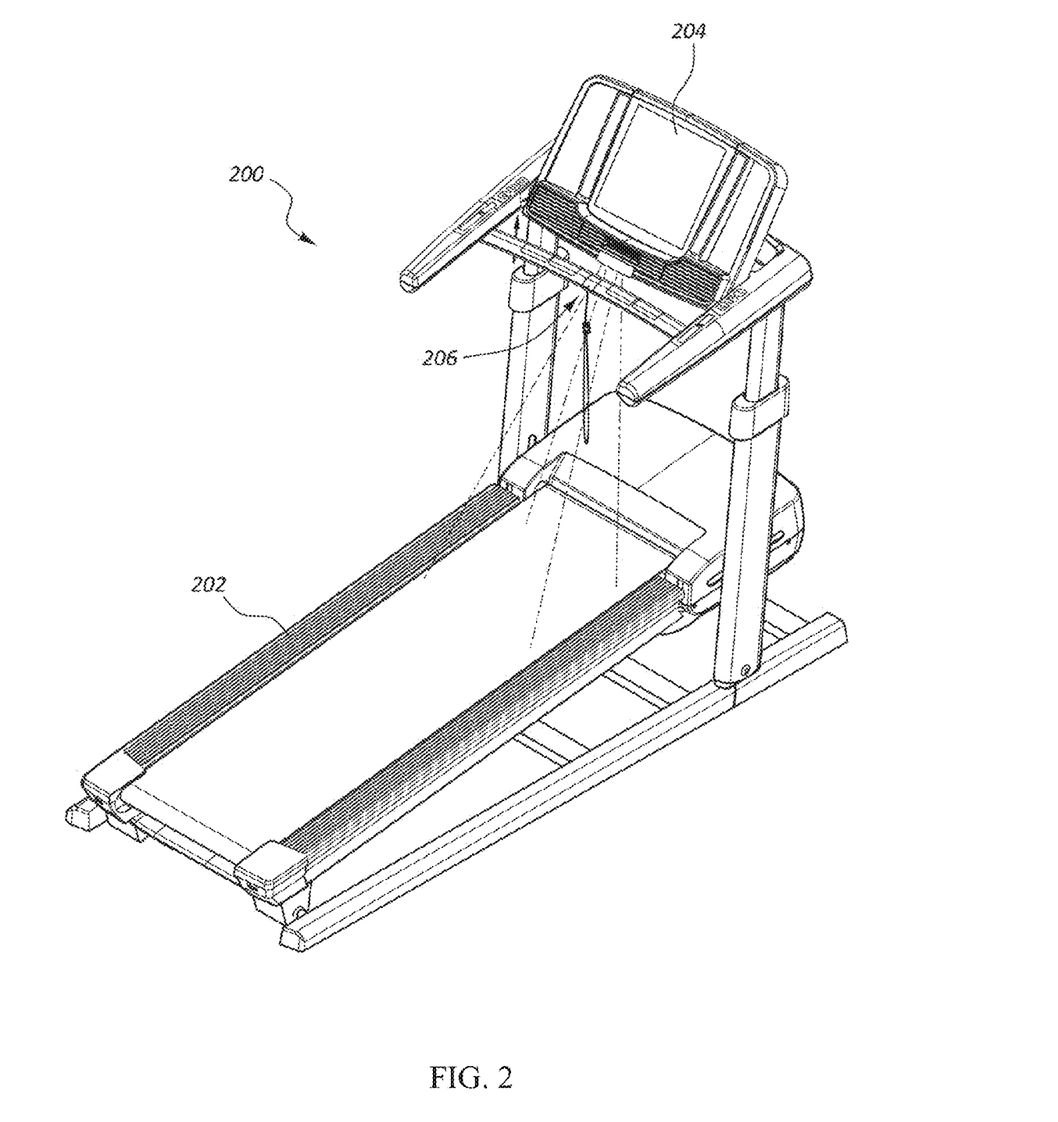
FIG. 2 depicts an example of a treadmill in accordance with aspects of the present disclosure.

FIG. 2 depicts an example of a treadmill 200. In this example, the deck 202 is inclined so that the front portion of the deck 202 is elevated. As shown, by the arrow in FIG. 2, the display 204 and emergency stop feature 206 may also be inclined with the front portion of the deck 202. At this inclined angle, the user may perform an exercise on the deck 202. At the inclined angle, gravity pulls on the user's weight, which offsets at least some of the mechanical load on the motor for driving the tread belt as the user pushes against the tread belt during the performance of an exercise. Often, the power supplied to the motor is reduced accordingly, to slow the tread belt and keep the tread belt traveling at the desired, consistent speed. Under these conditions, the tread belt is still traveling at the output speed that is consistent with the amount of electricity supplied to the motor because the amount is reduced to be consistent with the reduced mechanical load. At some angles, the user's body weight applies a force sufficiently large that the motor receives a minimal amount of electrical power to keep the tread belt operating at the output speed.

However, in some circumstances, the angle of the deck, the weight of the user, the friction between the tread belt and the deck, other factors, or combinations thereof, cause the drive shaft's motor to rotate at a faster speed than the output speed. This condition may be referred to as a runaway condition. While this example is described as a runaway condition, in other cases, the runaway condition may be caused by any number of different circumstances. The runaway condition may cause the motor to generate electrical power, heat, and/or cause damage to the motor or other components of the treadmill.

Figure 3:
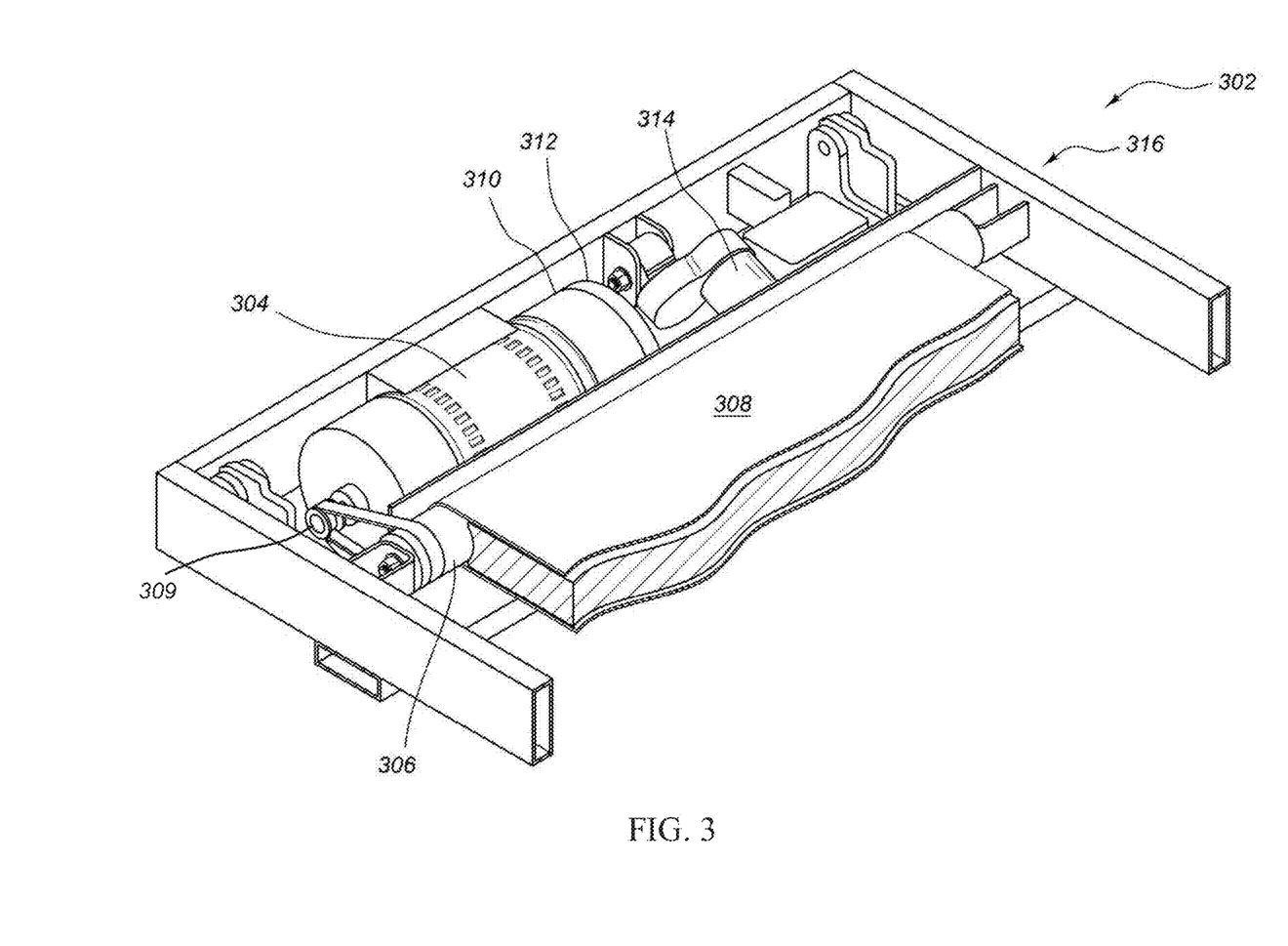
FIG. 3 depicts an example of a treadmill motor in accordance with aspects of the present disclosure.

FIG. 3 illustrates an example of a treadmill 302 with a portion of the housing removed for illustrative purposes. Inside the housing, a drive motor 304 is disposed adjacent to a pulley 306 that moves the tread belt 308 in a rotational direction. The drive motor 304 is attached to the pulley 306 by a drive shaft 309. A power supply (not shown) supplies power to the drive motor to drive the rotation of the drive shaft 309. The power supply may be an external source, such as an alternating current system incorporated into a residence or other building, a generator, an alternative power source, another type power source, or combinations thereof. In some instances, the power supply may be internal to the housing and/or treadmill 302. Attached to and coaxial with the drive motor 304 is a flywheel 310. The flywheel 310 rotates with the drive motor 304.

A lift motor 314 is connected to the deck 316 and also to the base frame (not shown) of the treadmill. When activated, the lift motor 314 causes a rod to extend downward, which pushes against the front portion of the deck and the base frame causing the front portion of the deck to raise. In other situations, when the lift motor 314 is activated, the rod is retracted, which causes the front portion of the deck to lower. In these cases, the lift motor 314 may be transversely oriented with respect to the fan assembly 312. While this example has been described as having a lift motor as part of a system for inclining the deck, any appropriate mechanism may be used to incline the deck.

Figure 4:
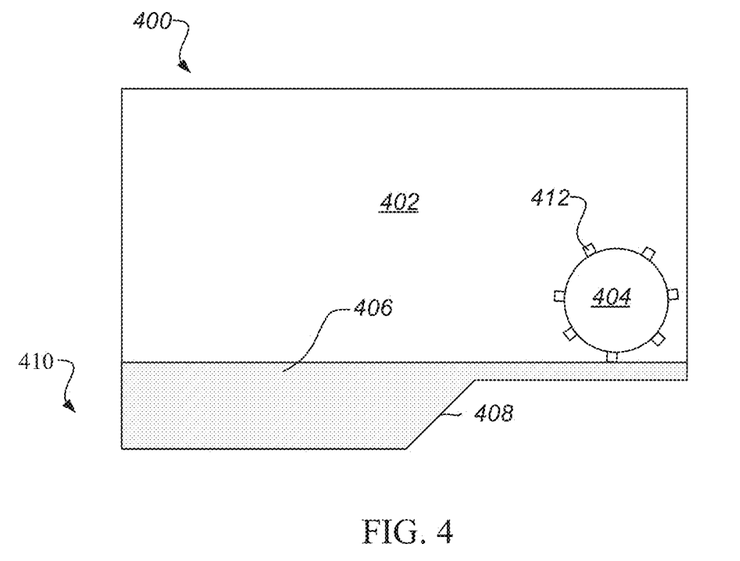
FIG. 4 depicts an example of a runaway mitigation mechanism in accordance with aspects of the present disclosure.

FIG. 4 depicts an example of a runaway mitigation mechanism 400. In this example, the runaway mitigation mechanism 400 includes a container 402 and a portion of the drive shaft 404 partially disposed within the container 402. The container 402 includes a fluid 406, such as an oil-based fluid. In some cases, the container 402 moves with the deck. When the deck is in a level orientation, the container 402 is held at a corresponding orientation. On the other hand, when the deck is inclined at an angle, the container 402 is held in a tilting orientation.

In the level orientation, the fluid 406 resides under the drive shaft 404 without making contact with the drive shaft 404. In the illustrated example, the container 402 includes a trough 408 defined in the far portion 410 of the container 402 where the fluid 406 can pool away from the drive shaft 404. However, in alternative embodiments, no trough is included. In these embodiments, the geometry of the container 402 may be such that the fluid pools away from the drive shaft when the deck is not sufficiently tilted. In other embodiments, the fluid 406 may be stored in a separate reservoir, and selectively introduced to the container 402 via a pump, when a runaway condition is detected.

In the illustrated example, at least one vane 412 is attached to the drive shaft 404. While this example has been depicted with a vane, any appropriate number or shape of vanes may be incorporated into the drive shaft 404.

Figure 5:
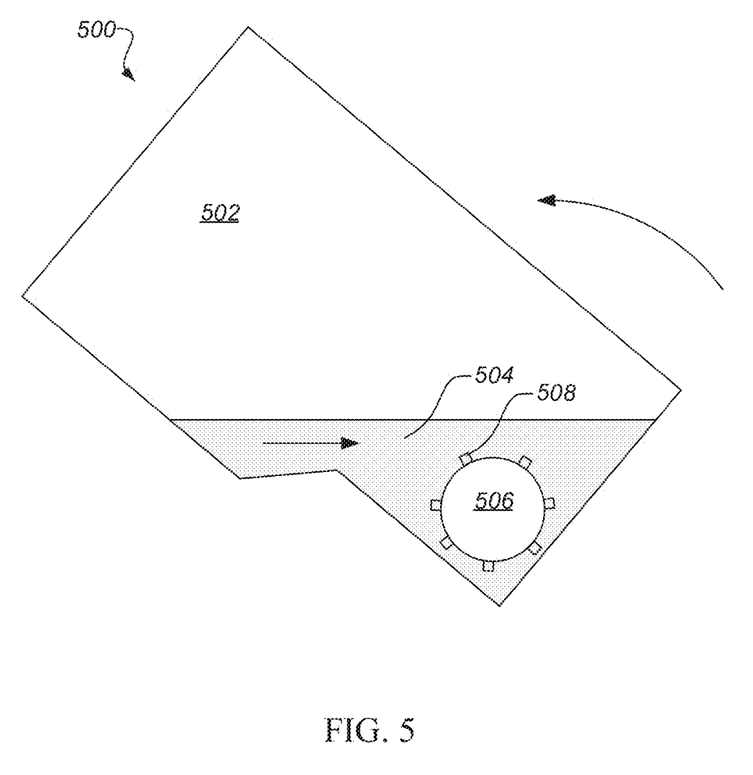
FIG. 5 depicts an example of a runaway mitigation mechanism in accordance with aspects of the present disclosure.

FIG. 5 depicts an example of a runaway mitigation mechanism 500 where the container 502 is oriented in a tilted orientation. With the container 502 in a tilted orientation, the fluid 504 pools in the proximity of the drive shaft 506 so that the fluid 504 is in contact with the drive shaft 506. In the illustrated example, the drive shaft 506 is immersed in the fluid 504 so that an entire circumference of the drive shaft 506 is in contact with the fluid 504. In some examples, the contact with the drive shaft 506 resists rotation of the drive shaft 506. In some cases, the viscosity of the fluid 504 engages and resists the movement of the vanes 508.

Figure 6:
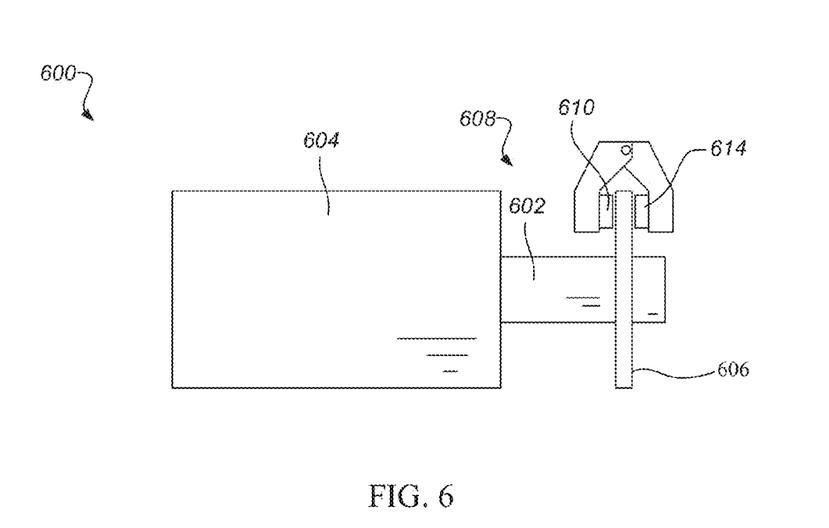
FIG. 6 depicts an example of a runaway mitigation mechanism in accordance with aspects of the present disclosure.

FIG. 6 illustrates an example of a runaway mitigation mechanism 600. In this example, a drive shaft 602 extends beyond a motor casing 604, and a rotary disc 606 is rigidly attached to the drive shaft 602. A compression brake 608 is positioned adjacent to the rotary disc 606. The compression brake 608 includes a first pad 610 adjacent a first side of the rotary disc 606, and a second pad 614 adjacent a second side of the rotary disc 606. When activated, the first pad 610 and the second pad 614 move towards the rotary disc 606 simultaneously and apply a compressive load to the rotary disc 606, which resists rotational movement of the rotary disc 606. This increases the mechanical load on the motor because of the increased resistance to rotate the drive shaft 602. Under certain conditions, the compression brake 608 applies a compressive load that is sufficient to prevent the rotary disc 606, and therefore the drive shaft 602, from rotating at all. Under other conditions, the compression brake 608 can apply a compressive load that merely increases the resistance to the rotational movement of the rotary disc 606, but is not sufficient to stop the drive shaft 602 from rotating. When a runaway condition is sensed or at least determined to exist, the compression brake 608 can be activated to increase the mechanical resistance to the motor to at least mitigate the runaway condition.

Figure 7:
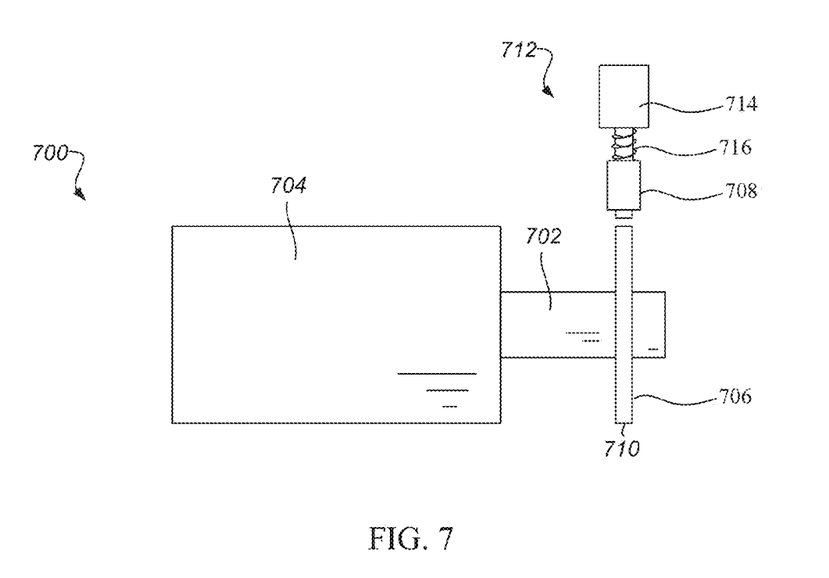
FIG. 7 depicts an example of a runaway mitigation mechanism in accordance with aspects of the present disclosure.

FIG. 7 depicts an example of a runaway mitigation mechanism 700. In this example, a drive shaft 702 extends beyond a motor casing 704, and a rotary disc 706 is rigidly attached to the drive shaft 702. In the illustrated example, the rotary disc 706 includes at least some magnetically conductive material. A magnetic unit 708 is positioned adjacent to the rim 710 of the rotary disc 706. The magnetic unit 708 can apply a magnetic force on the rotary disc 706 that resists movement of the rotary disc 706 and therefore movement of the drive shaft 702.

The magnetic unit 708 is positionable with a linear actuator 712. The linear actuator 712 includes an actuator motor 714 and a screw rod 716. As the motor operates in a first direction, the screw rod 716 moves the magnetic unit 708 in a direction towards the rotary disc 706. As the motor operates in a second direction, the screw rod 716 moves the magnetic unit 708 in another direction away from the rotary disc 706. As the magnetic unit 708 approaches the rotary disc 706, the magnetic load applied to the rotary disc 706 increases so that more resistance is applied to the rotary disc's movement, and mechanical resistance on the motor increases. As the magnetic unit 708 moves away from the rotary disc 706, the magnetic load on the rotary disc 706 decreases, which lowers mechanical resistance on the motor. In alternative embodiments, the magnetic unit is an electromagnet that produces a magnetic field that is proportional to the power supplied to the magnetic unit. In this example, the magnetic strength applied to the rotary disc is adjustable by varying the power to the magnetic unit.

Figure 8:
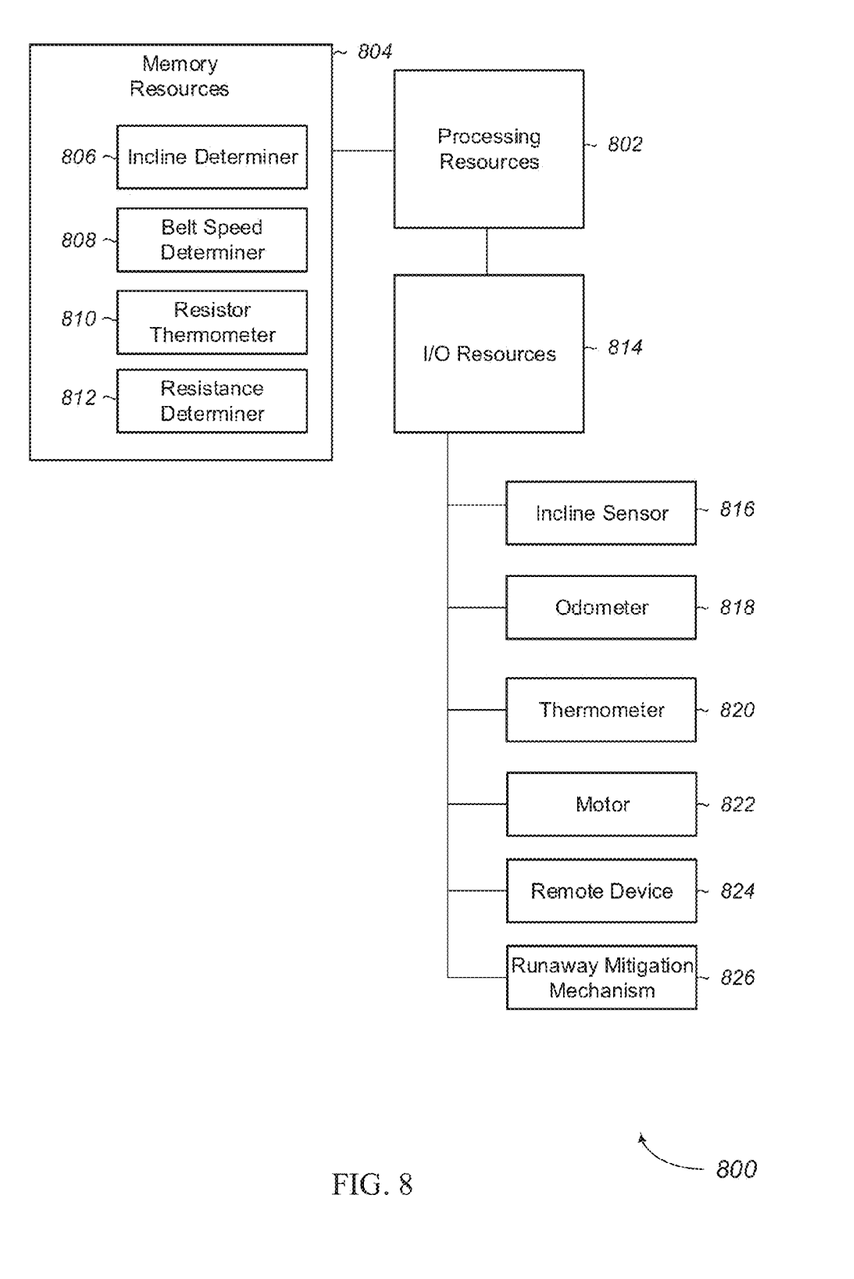
FIG. 8 depicts a block diagram of an example of a runaway mitigation system in accordance with aspects of the present disclosure.

FIG. 8 illustrates a block diagram of an example of a runaway mitigation system 800, in accordance with the present disclosure. The runaway mitigation system 800 may include a combination of hardware and programmed instructions for executing the functions of the runaway mitigation system 800. In this example, the runaway mitigation system 800 includes processing resources 802 that are in communication with memory resources 804. Processing resources 802 include at least one processor and other resources used to process the programmed instructions. The memory resources 804 represent generally any memory capable of storing data such as programmed instructions or data structures used by the runaway mitigation system 800. The programmed instructions and data structures shown stored in the memory resources 804 include an incline determiner 806, a belt speed determiner 808, a resistor thermometer 810, and a resistance determiner 812.

Input/output (I/O) resources 814 are in communication with the processing resources 802. The I/O resources 814 may include any appropriate type of mechanism for communicating with remote devices. For example, the I/O resources 814 may include a transmitter, a wireless transmitter, a receiver, a transceiver, a port for receiving an external memory, a network interface, another I/O resource, or combinations thereof.

The I/O resources may be in communication with any appropriate device. In the illustrated example, the I/O resources 814 are in communication with an incline sensor 816, an odometer 818, a thermometer 820, a motor 822, another remote device 824, a runaway mitigation mechanism 826, or combinations thereof. These remote devices may be located on the treadmill, may be independent of the treadmill, may be in communication with the I/O resources over a network, may be part of a wearable device, or combinations thereof.

Figure 9:
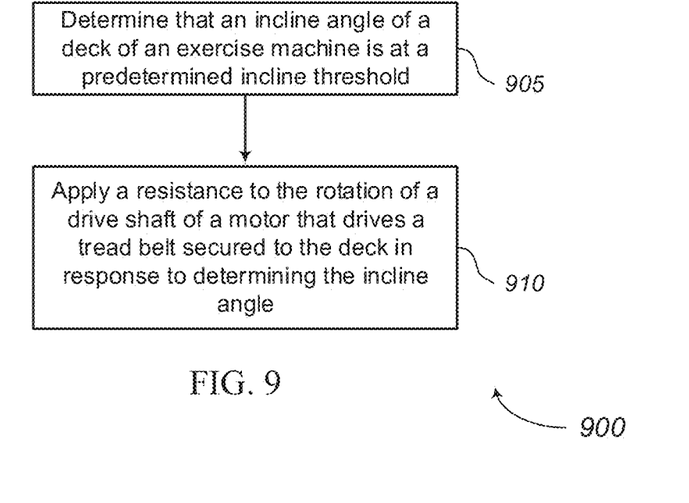
FIG. 9 depicts an example of a method for mitigating runaway on a treadmill motor in accordance with aspects of the present disclosure.

FIG. 9 shows a flowchart illustrating a method 900 for mitigating a runaway condition. The operations of method 900 may be implemented by a runaway mitigation system or its components as described herein. In some examples, a runaway mitigation system may execute a set of codes to control the functional elements of the device to perform the functions described below. Additionally or alternatively, the runaway mitigation system may perform aspects of the functions described below using special-purpose hardware. At block 905, an incline angle of the deck of an exercise machine is determined to be at a predetermined incline threshold. At block 910, a resistance is applied to the rotation of a drive shaft of a motor that drives a tread belt secured to the deck in response to determining the incline angle.

Figure 10:
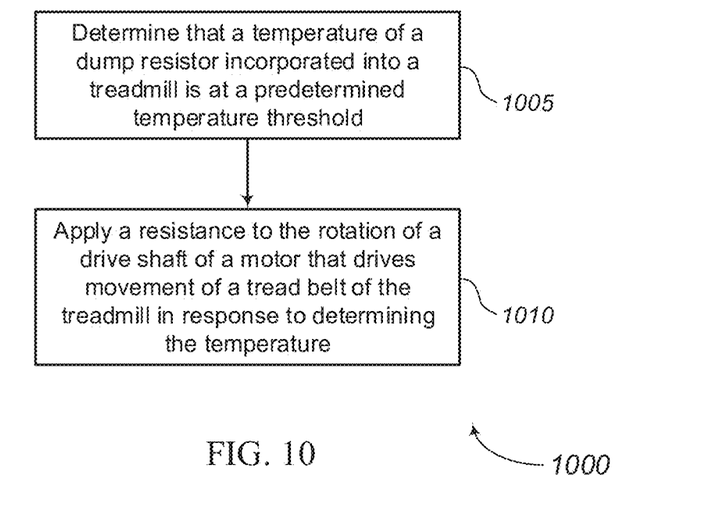
FIG. 10 depicts an example of a method for mitigating runaway on a treadmill motor in accordance with aspects of the present disclosure.

FIG. 10 shows a flowchart illustrating a method 1000 for mitigating a runaway condition. The operations of method 1000 may be implemented by a runaway mitigation system or its components as described herein. In some examples, a runaway mitigation system may execute a set of codes to control the functional elements of the device to perform the functions described below. Additionally or alternatively, the runaway mitigation system may perform aspects of the functions described below using special-purpose hardware. At block 1005, a temperature of a dump resistor incorporated into a treadmill is determined to be at a predetermined temperature threshold. At block 1010, a resistance is applied to the rotation of a drive shaft of a motor that drives movement of a tread belt of the treadmill in response to determining the temperature.

GENERAL DESCRIPTION

In general, the invention disclosed herein may provide users with an exercise machine that mitigates the effects of motor runaway. Not all commercial treadmills experience motor runaway due to a deck incline angle. However, in some cases where the treadmill deck inclines at a steeper angle than the industry's conventional treadmills do, the mechanical load on the treadmill motor can drop to a point where the motor that drives the tread belt experiences a runaway condition. In some situations, a runaway condition may result in the motor producing electricity. This electricity has to be directed somewhere, and in some cases, the runaway electricity is directed to a dump resistor where the excess electricity is converted to heat. This excess heat may raise the temperature of other components in the treadmill, which may reduce their useful life.

The load on the motor may be affected by multiple factors, such as the weight of the user, the angle of the deck, the friction between the tread belt and the deck's platform, the friction of the pulleys, the weight of the pulleys, the weight of the tread belt, other factors, or combinations thereof. When the angle of the treadmill's deck is substantially horizontal, the tread belt moves the user along the length of the deck. As the angle of the deck inclines, the user's weight pushes down on the tread belt as the user performs an exercise. For example, as the user applies a load on the tread belt when he or she pushes off of the tread belt during a walking or running exercise, the leg applies a downward force on the tread belt, which helps move the tread belt along in the same direction that the motor is driving the tread belt. The amount of force that contributes to the movement of the tread belt from the user depends, in part, on how hard the user applies the force and also the steepness of the incline angle. As a general rule, the steeper the incline angle, the more force that the user applies due to gravity pulling on the user. The weight of the user also affects the load to the tread belt as a heavier user may apply a greater load to the tread belt.

With the load applied by the user's weight moving the tread belt, at least in part, the electrical load on the motor can be reduced to keep the tread belt moving at the desired speed. However, in some cases, the weight of the user may cause the tread belt to move faster than the speed that the motor would otherwise run given the power load and the angle. In these cases, the motor may generate electricity as part of a runaway condition.

A runaway mitigation mechanism may apply an increased load on the motor, which can result in mitigating and/or eliminating the runaway condition. When mitigating the runaway condition, the amount of electricity produced by the motor may be reduced or entirely eliminated.

The treadmill may include a frame, a deck attached to the frame, and a tread belt incorporated into the deck. The frame may include a base portion that supports the deck on a support surface, such as a floor. A front pulley may be connected to a front portion of the deck, and a rear pulley may be connected to a rear portion of the deck. A tread belt surrounds the front pulley and the second pulley. A motor can drive either the front pulley or the rear pulley and cause the tread belt to move along a surface of the deck. The speed of the tread belt may be adjustable, based on the motor's output. In some cases, the user can select the tread belt's speed through an input incorporated into the treadmill.

In some examples, the treadmill includes an incline mechanism that is integrated into the base and controls an elevation of the front portion of the deck. The rear portion of the deck is connected to the base at a pivot connection. As the incline mechanism changes the elevation of the front portion of the deck, the rear portion of the deck remains connected to the base. Thus, the front portion of the deck inclines with respect to the base.

In some examples, the treadmill includes an upright structure that is connected to the base. In these examples, the upright structure includes a first post and a second post. The first post and the second post may include a console. The console may include an input mechanism that controls an operational parameter of the treadmill. In some cases, the console includes a cooling mechanism (e.g. fan), speakers, microphones, sensors, other features, or combinations thereof. In some cases, the console includes a display.

In some cases, the motor is located inside a housing. The drive motor may be disposed adjacent to a pulley that moves the tread belt in a rotational direction. The drive motor may be attached to the pulley with a drive shaft. A power supply may provide power to the motor to drive the rotation of the drive shaft. The power supply may be an external source, such as an alternating current system incorporated into a residence or other building, a generator, an alternative power source, another type power source, or combinations thereof. In some instances, the power supply may be internal to the housing and/or treadmill. In some cases, a flywheel is attached to and coaxial with the drive motor. The flywheel may rotate with the drive motor.

A lift motor may be connected to the deck and to the base frame of the treadmill. When activated, the lift motor may cause a rod to extend downward, which pushes against the front portion of the deck and the base frame, causing the front portion of the deck to raise. In other situations, when the lift motor is activated, the rod is retracted, which causes the front portion of the deck to lower. In these cases, the lift motor may be transversely oriented with respect to the fan assembly. While this example has been described in the context of having a lift motor as part of a system for inclining the deck, any appropriate mechanism may be used to incline the deck.

In those examples where the treadmill includes a console display, the console display may depict information about the user, the operational parameters of the treadmill, entertainment, other features, or combinations thereof. In those examples where the exercise machine is without a console, the exercise machine may be less expensive to manufacture, move, set up, transport, or combinations thereof.

The exercise machine may collect data about the user's physiological condition during the performance of an exercise. In some cases, sensors are incorporated into the exercise machine to gather specific types of physiological information about the user. These sensors may be located on the exercise machine where the user comes into contact with the exercise machine. For example, an electrical contact that is part of a heart rate monitoring system may be incorporated into hand rails, handles, or other types of supports incorporated into the exercise machine. The electrical contacts may detect electrical pulses transmitted through the user's body during the exercise, and these measurements may be used to determine the user's heart rate.

The existence of a runaway condition may be determined through any appropriate mechanism. For example, a current measuring device may determine if electricity is being generated by the motor. In those circumstances where the electricity is being generated by the motor, the processing resources may determine that a runaway condition exists. Any appropriate type of device to measure the amount of power produced by the motor may be used. In some examples, an ohmmeter, an ammeter, a multimeter, a capacitor, another type of measurement device, or combinations thereof may be used. In some cases, any electricity that is generated may be directed to a dump resistor where the electricity is converted to heat. A thermometer may be used to measure the dump resistor's temperature. In those cases where the thermometer records that the dump resistor's temperature is above a baseline temperature, the processing resources may determine that a runaway condition exists.

In other examples, a runaway condition may be presumed when the incline of the deck is above a certain threshold. While other factors may affect when a runaway condition exists, like the user's weight, the sensing electronics may be simplified by presuming that a runaway condition exists solely based on the deck's incline angle. In some cases when the runaway condition is presumed, the processing resources may determine that a runaway condition exists. In this type of example, the mechanical resistance on the motor may be increased regardless of whether an actual runaway condition exists or not. In other circumstances, the processing resources may initiate additional tests when a presumption of a runaway condition exists and initiate a runaway mitigation procedure in response to the findings of those tests.

In some cases, the user's weight is known or at least determinable to the processing resources. For example, the user may input his or her weight into an input mechanism incorporated into the console or through a remote device in communication with the treadmill. The weight of the user may determine which incline angle is classified as a runaway condition threshold angle. In other examples, the requested speed of the tread belt may affect and partially determine which incline angle is classified as a runaway condition threshold angle.

In other examples, a rotary sensor is associated with the drive shaft, a flywheel, a pulley, another rotary device, or combinations thereof that determine how fast these components are operating. The speed that the motor should be running based on the amount of electricity inputted into the motor may be compared with the actual speed of the motor to determine whether a runaway condition exists.

In another example, the motor is determined to be in a runaway condition if the angle of the incline deck is above a predetermined threshold angle. In some cases, this predetermined threshold angle is adjustable based on the weight of the user, the inputted speed for the tread belt to move, other factors, or combinations thereof.

The runaway mitigation system may include a combination of hardware and programmed instructions for executing the functions of the runaway mitigation system. In this example, the runaway mitigation system includes processing resources that are in communication with memory resources. Processing resources include at least one processor and other resources used to process the programmed instructions. The memory resources represent generally any memory capable of storing data such as programmed instructions or data structures used by the runaway mitigation system. The programmed instructions and data structures shown stored in the memory resources include an incline determiner, a belt speed determiner, a resistor thermometer, and a resistance determiner.

Input/output (I/O) resources are in communication with the processing resources. The I/O resources may include any appropriate type of mechanism for communicating with remote devices. For example, the I/O resources may include a transmitter, a wireless transmitter, a receiver, a transceiver, a port for receiving an external memory, a network interface, another I/O resource, or combinations thereof.

The I/O resources may be in communication with any appropriate device. In the illustrated example, the I/O resources are in communication with an incline sensor, an odometer, a thermometer, a motor, another remote device, a runaway mitigation mechanism, or combinations thereof. These remote devices may be located on the treadmill, may be independent of the treadmill, may be in communication with the I/O resources over a network, may be part of a wearable device, or combinations thereof. Such protocols may include standard wireless protocols, protocols used by Bluetooth® technologies, Wi-Fi protocols, Z-wave protocols, Zigbee protocols, other types of wireless protocols, or combinations thereof.

The processing resources may include one or more processors. The processing resources may include an intelligent hardware device, (e.g., a general-purpose processor, a digital signal processor (DSP), a central processing unit (CPU), a microcontroller, an application specific integrated circuit (ASIC), a field-programmable gate array (FPGA), a programmable logic device, a discrete gate or transistor logic component, a discrete hardware component, or any combination thereof). In some cases, the processing resources may be configured to operate a memory array using a memory controller. In other cases, a memory controller may be integrated into the processor. The processing resources may be configured to execute computer-readable instructions stored in a memory to perform various functions (e.g., function or tasks supporting overlaying exercise information on a remote display).

An I/O controller may manage input and output signals for the runaway mitigation system and/or the exercise machine. Input/output control components may also manage peripherals not integrated into these devices. In some cases, the input/output control component may represent a physical connection or port to an external peripheral. In some cases, I/O controller may utilize an operating system such as iOS®, ANDROID®, MS-DOS®, MS-WINDOWS®, OS/2®, UNIX®, LINUX®, or another known operating system.

Memory resources may include random access memory (RAM) and read only memory (ROM). The memory may store computer-readable, computer-executable software including instructions that, when executed, cause the processor to perform various functions described herein. In some cases, the memory resources can contain, among other things, a Basic Input-Output system (BIOS) which may control basic hardware and/or software operation such as the interaction with peripheral components or devices.

The incline determiner represents programmed instructions that, when executed, cause the processor to determine the incline of the treadmill deck. In some cases, the incline determiner requests the angle from a distance sensor, from a level sensor, from a gravity sensor, from an accelerometer, from another type of sensor, or combinations thereof. In response, the sensor may send raw data to the incline determiner where the raw data is interpreted to determine the incline angle. In other examples, the incline determiner receives data that is at least partially processed. In other examples, the incline mechanism of the treadmill is in communication with the incline determiner. The incline mechanism may know the incline angle at which it has set the deck and may continuously send, periodically send, or send on demand information about the angle to the incline determiner.

The belt speed determiner represents programmed instructions that, when executed, cause the processor to determine the speed that the tread belt is moving. In some cases, the speed determiner requests the speed from an odometer, optical sensor, an accelerometer, another type of sensor, or combinations thereof. In response, the sensor may send raw data to the speed determiner where the raw data is interpreted to determine the tread belt speed. In other examples, the belt speed determiner receives data that is at least partially processed.

The resistor thermometer represents programmed instructions that, when executed, cause the processor to determine a temperature of at least one component of the treadmill that is indicative of a runaway condition. In one example, the resistor thermometer may measure the temperature of a dump resistor that is in electrical communication with the motor. In those conditions where the motor is in a runaway condition, the motor may be generating electricity and the generated electricity may be directed to the dump resistor to convert this electricity into heat. Under those circumstances where the dump resistor's temperature is above a predetermined threshold, the processor may determine that a runaway condition exists.

The resistance determiner represents programmed instructions that, when executed, cause the processor to determine a resistance load on the motor. The resistance determiner may take inputs from the incline determiner, the belt speed determiner, the resistor thermometer, a user weight input, an inputted tread belt speed, an actual tread belt speed, other information, or combinations thereof.

In some cases, the resistance determiner measures the speed inputted into the console by the user to operate the tread belt (inputted speed). The inputted speed may be compared to the actual speed determined by the belt speed determiner or through another mechanism. If the actual speed and the inputted speed do not match, the resistance determiner may conclude that the resistance on the motor is too low to prevent a runaway condition or the processor may determine that a runaway condition exists.

In some examples, the resistance determiner may determine that an insufficient load exists on the motor to prevent a runaway condition when the temperature of the resistor is above a predetermined temperature threshold. In other examples, the resistance determiner may determine that an insufficient amount of resistance exists on the motor when the incline deck is orientated at an angle above a predetermined threshold angle.

While the above examples have been described with reference to specific mechanisms for determining that a runaway condition exists, any appropriate mechanism may be used to determine whether a runaway condition exists. In some examples, sensors incorporated into the treadmill are used to determine the existence of a runway condition. In other examples, sensors or information from a remote device may at least contribute to determining whether a runaway condition exists.

The treadmill may include a runaway mitigation mechanism. In some examples, the runaway mitigation mechanism is an active mechanism that operates in response to a determination that a runaway condition exists or is at least approaching a potential runaway condition. The active runaway mitigation mechanism may respond by increasing the load on the motor. In other examples, the runaway mitigation mechanism is a passive mechanism that automatically applies a greater resistance to the motor.

The active runaway mitigation mechanism may prevent a runaway condition from starting or may reduce, or even eliminate, the runaway condition. The active runaway condition mitigation mechanism may include a braking mechanism, a compressive braking mechanism, a hydraulic mechanism, a pneumatic mechanism, another type of mechanism, or combinations thereof that apply mechanical resistance to a rotation of the motor's drive shaft.

In some cases, a drive shaft extends beyond a motor casing, and a rotary disc is rigidly attached to the drive shaft. In some of these examples, a compression brake can be positioned adjacent to the rotary disc. The compression brake may include a first pad adjacent a first side of the rotary disc, and a second pad adjacent a second side of the rotary disc. When activated, the first pad and the second pad move towards the rotary disc simultaneously and apply a compressive load to the rotary disc which resists rotational movement of the rotary disc. Under certain conditions, the compression brake may apply a compressive load that is sufficient to prevent the rotary disc, and therefore the drive shaft, from rotating at all. Under other conditions, the compression brake may apply a compressive load that merely increases the resistance to the rotational movement of the rotary disc, but is not sufficient to stop the drive shaft from rotating. When a runaway condition is sensed, the compression brake may be activated to increase the mechanical resistance to the motor to at least mitigate the runaway condition.

In another example, the rotary disc may include at least some magnetically conductive material. A magnetic unit may be positioned adjacent to a rim of the rotary disc. The magnetic unit may apply a magnetic force on the rotary disc that resists movement of the rotary disc and therefore movement of the drive shaft.

The magnetic unit may be positionable with a linear actuator. The linear actuator may include an actuator motor and a screw rod. In this example, as the motor operates in a first direction, the screw rod moves the magnetic unit in a direction towards the rotary disc. In the same example, as the motor operates in a second direction, the screw rod moves the magnetic unit in another direction away from the rotary disc. As the magnetic unit approaches the rotary disc, the magnetic load applied to the rotary disc may increase so that more resistance is applied to the rotary disc's movement and mechanical resistance on the motor increases. Similarly, as the magnetic unit moves away from the rotary disc, the magnetic load on the rotary disc may decrease, which lowers mechanical resistance on the motor. In alternative embodiments, the magnetic unit is an electromagnet that produces a magnetic field that is proportional to the power supplied to the magnetic unit. In this example, the magnetic strength applied to the rotary disc is adjustable by varying the power to the magnetic unit. In yet additional embodiments, a viscous fluid may be selectively introduced into a container housing the drive shaft when a runaway condition is present.

In those examples where the runaway mitigation mechanism is passive, the resistance may be applied automatically without a command instruction to the motor under those circumstances when a runaway condition is more likely to occur. For example, the increased resistance on the motor may be automatically applied when the treadmill deck is inclined above a predetermined threshold angle.

In one example of a passive runaway mitigation mechanism, the mechanism includes a container and a portion of the drive shaft is partially disposed within the container. The container includes a fluid, such as an oil-based fluid. In some cases, the container moves with the deck. So, when the deck is in a level orientation, the container is held at a corresponding orientation. On the other hand, when the deck is inclined at an angle, the container is held in a tilting orientation.

In the level orientation, the fluid resides under the drive shaft without making contact with the drive shaft. In the tilted orientation, the fluid may pool in the proximity of the drive shaft so that the fluid is in contact with the drive shaft. In the illustrated example, the drive shaft is immersed in the fluid so that an entire circumference of the drive shaft is in contact with the fluid. In some examples, the contact with the drive shaft resists rotation of the drive shaft. In some cases, the viscosity of the fluid resists the rotation of the shaft. In some cases, the shaft has a generally symmetric shape, and the surface friction of the cylindrical shape and the fluid increases the resistance to the rotation of the drive shaft.

In other examples, the drive shaft may include features that increase the amount of resistance applied from at least partial immersion into the fluid. One feature that may increase the resistance includes at least one vane attached to the drive shaft. The vane may push against the fluid as the drive shaft rotates thereby increasing the resistance to the rotation of the drive shaft. While this example has been depicted in the context of using a vane for increasing the resistance to the drive shaft's rotation, any appropriate type of feature that can increase the resistance via engagement with the fluid may be incorporated into the drive shaft.

In another example, a magnet may come into closer proximity with the drive shaft as the deck is inclined. In this example, the closer that the magnet is to the drive shaft, the greater influence the magnet's flux has on the drive shaft resulting in a greater resistance to the rotation of the drive shaft.

It should be noted that the methods described above describe possible implementations, and that the operations and the steps may be rearranged or otherwise modified and that other implementations are possible. For example, the present systems and techniques may be applied to other components of the treadmill including, but in no way limited to, the pulleys. Furthermore, aspects from two or more of the methods may be combined.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a digital signal processor (DSP) and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed so that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can include RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. In some cases, the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. A portable medium, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples described herein, but is to be accorded the broadest scope consistent with the principles and novel features disclosed herein.

What is claimed is:

1. A treadmill, comprising:
   a deck;
   a first pulley incorporated into the deck;
   a second pulley incorporated into the deck;
   a tread belt surrounding the first pulley and the second pulley;
   a motor including a drive shaft, wherein the drive shaft is in mechanical communication with at least one of the first pulley and the second pulley to move the tread belt in a first direction;
   a runaway mitigation mechanism in at least indirect mechanical communication with the motor, the runaway mitigation mechanism including:
      a container surrounding a portion of the drive shaft; and
      a fluid within the container;
   wherein the runaway mitigation mechanism is configured to at least mitigate a motor runaway condition.

2. The treadmill of claim 1, wherein the motor runaway condition is induced when a user moves the tread belt with a force that is greater than that outputted with the motor.

3. The treadmill of claim 2, wherein the user moves the tread belt at the force that is greater than that which is outputted with the motor when an incline angle of the deck exceeds a threshold angle.

4. The treadmill of claim 3,
   wherein the container is configured to tilt with the deck, and
   wherein the container is shaped such that the fluid contacts the drive shaft when the deck is disposed at the threshold angle.

5. The treadmill of claim 4, wherein the portion of the drive shaft surrounded by the container further comprises at least one vane.

6. The treadmill of claim 4, wherein the portion of the drive shaft surrounded by the container is fully immersed in the fluid when the deck is oriented at a 12 degree incline.

7. The treadmill of claim 4, wherein the portion of the drive shaft surrounded by the container is partially immersed in the fluid when the deck is oriented at a 9 to 12 degree incline.

8. The treadmill of claim 4, wherein the fluid comprises an oil based fluid.

9. The treadmill of claim 3, wherein the runaway mitigation mechanism is configured to increase a resistance to an operation of the motor when the deck is oriented at the threshold angle that induces the motor runaway condition.

10. The treadmill of claim 3, wherein the threshold angle is over 9 degrees.

11. The treadmill of claim 3, wherein the threshold angle is over 11 degrees.

12. A treadmill, comprising:
    a deck;
    a first pulley incorporated into the deck;
    a second pulley incorporated into the deck;
    a tread belt surrounding the first pulley and the second pulley;
    a motor including a drive shaft, wherein the drive shaft is in mechanical communication with at least one of the first pulley and the second pulley;
    an incline mechanism in mechanical communication with the deck to adjust an incline angle of the deck; and
    a runaway mitigation mechanism in communication with the motor;
    wherein the runaway mitigation mechanism is configured to mitigate a motor runaway condition due to the incline angle of the deck;
    wherein the runaway mitigation mechanism includes:
       a container surrounding a portion of the drive shaft;
       a fluid disposed within the container;
    wherein the container is configured to tilt with the deck; and
    wherein the container is shaped such that the fluid contacts the drive shaft when the deck is disposed at a threshold angle.

13. The treadmill of claim 12, wherein the portion of the drive shaft surrounded by the container includes at least one vane.

14. The treadmill of claim 12, wherein the portion of the drive shaft surrounded by the container is fully immersed in the fluid when the deck is oriented at a 12 degree incline.

15. The treadmill of claim 12, wherein the motor runaway condition is induced when a user moves the tread belt with a force that is greater than the force outputted with the motor.

16. The treadmill of claim 12, wherein the fluid comprises an oil based fluid.

17. The treadmill of claim 12, wherein the incline angle that induces the motor runaway condition is over 11 degrees.

18. A treadmill, comprising:
    a deck;
    a first pulley incorporated into the deck;
    a second pulley incorporated into the deck;
    a tread belt surrounding the first pulley and the second pulley;
    a motor including a drive shaft, wherein the drive shaft is in mechanical communication with at least one of the first pulley and the second pulley;
    an incline mechanism in mechanical communication with the deck to adjust an incline angle of the deck;
    a runaway mitigation mechanism in communication with the motor;
    wherein the runaway mitigation mechanism mitigates a motor runaway condition where the motor runaway condition is induced with the incline angle of the deck;

wherein the runaway mitigation mechanism includes:
  a container that surrounds a portion of the drive shaft;
  an oil based fluid disposed within the container; and
  at least one vane formed on the portion of the drive shaft contained within the container;
wherein the container is configured to tilt with the deck;
wherein the container is shaped such that the fluid contacts the drive shaft when the deck is disposed at a threshold angle; and
wherein the drive shaft is fully immersed in the oil based fluid when the deck is oriented at a 12 degree incline.

* * * * *